Figure 6:
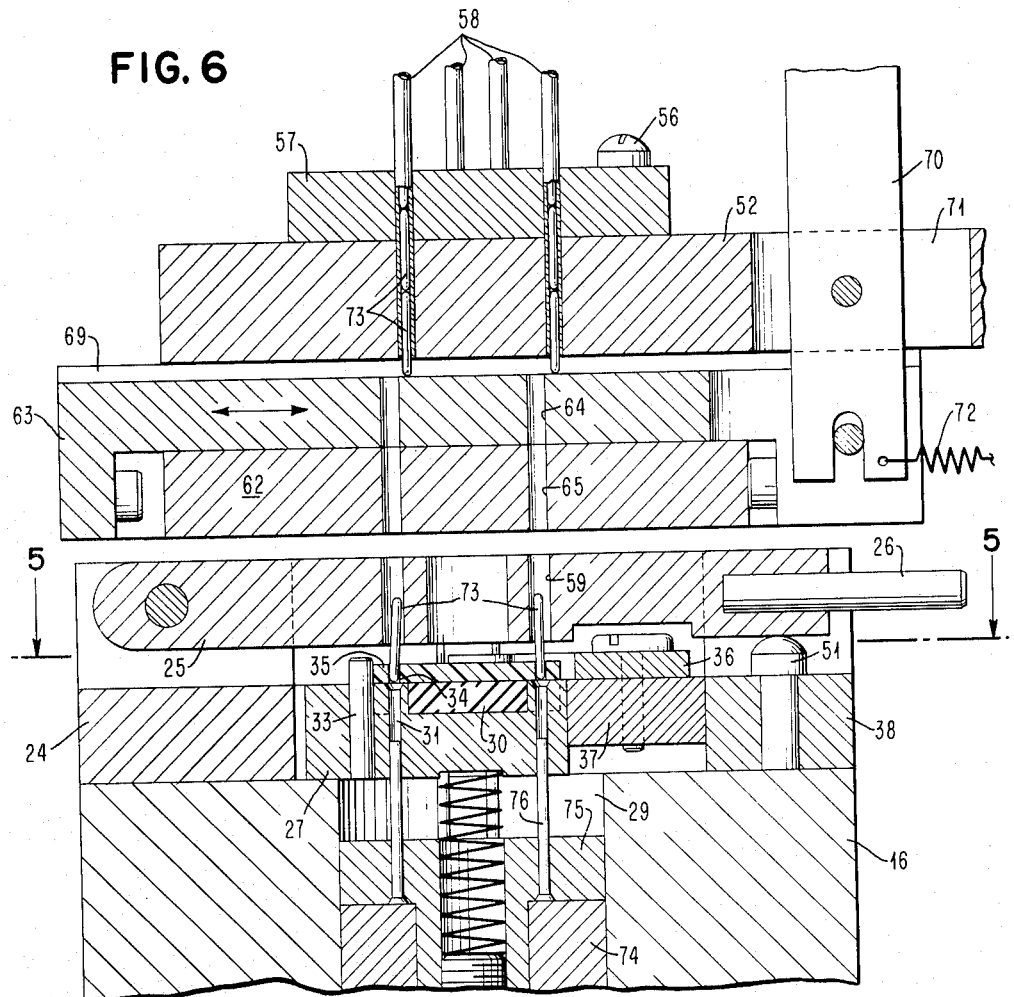

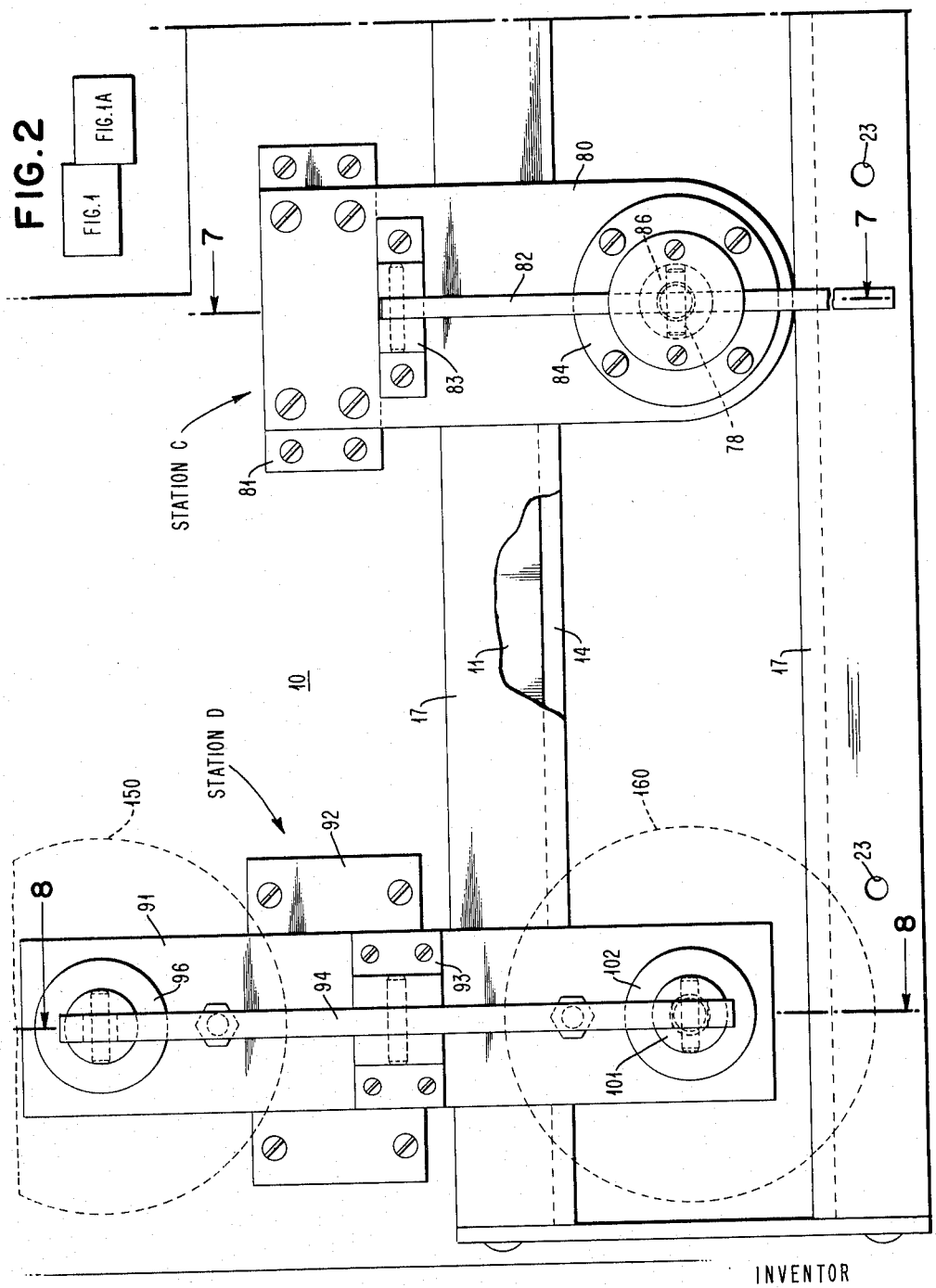

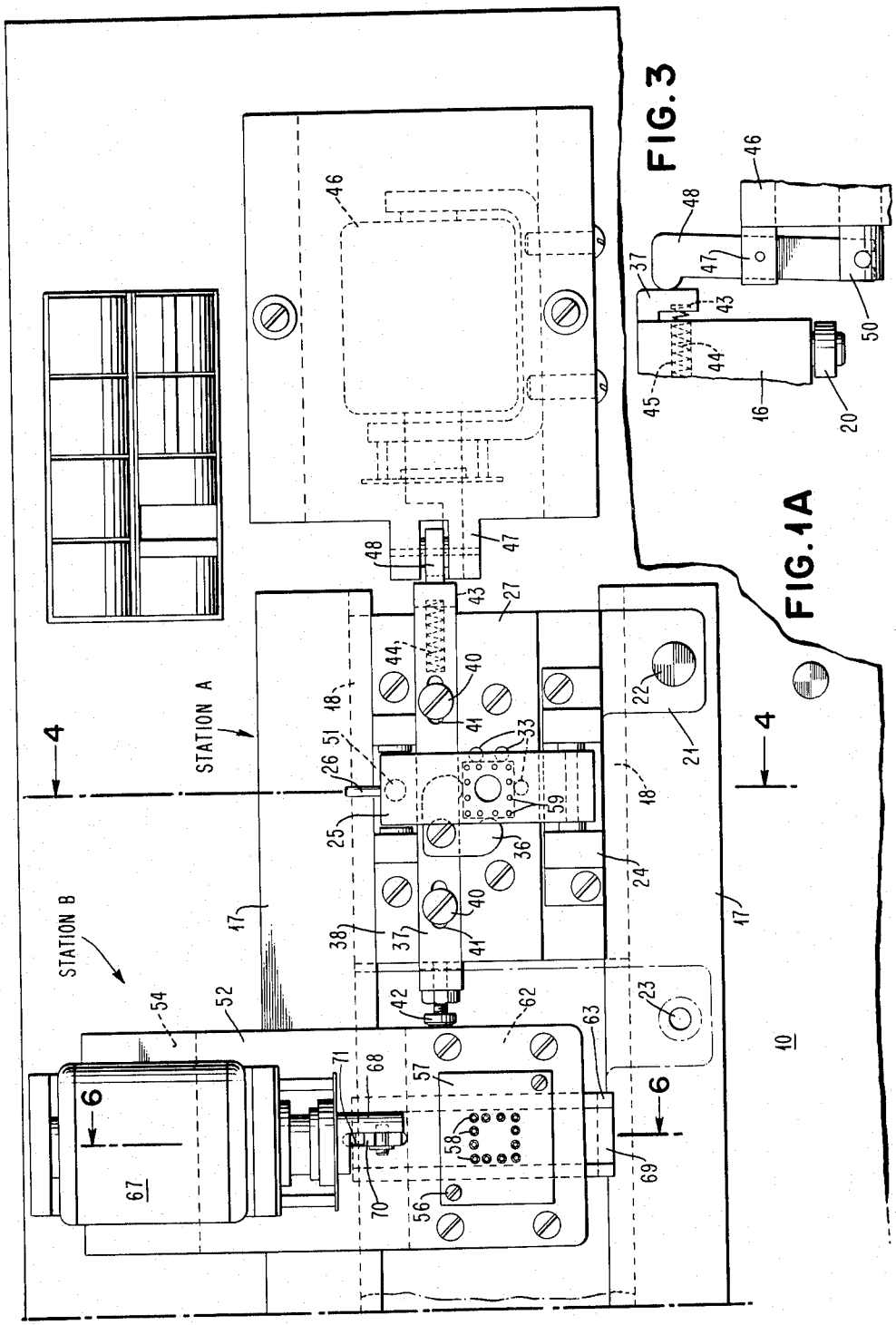

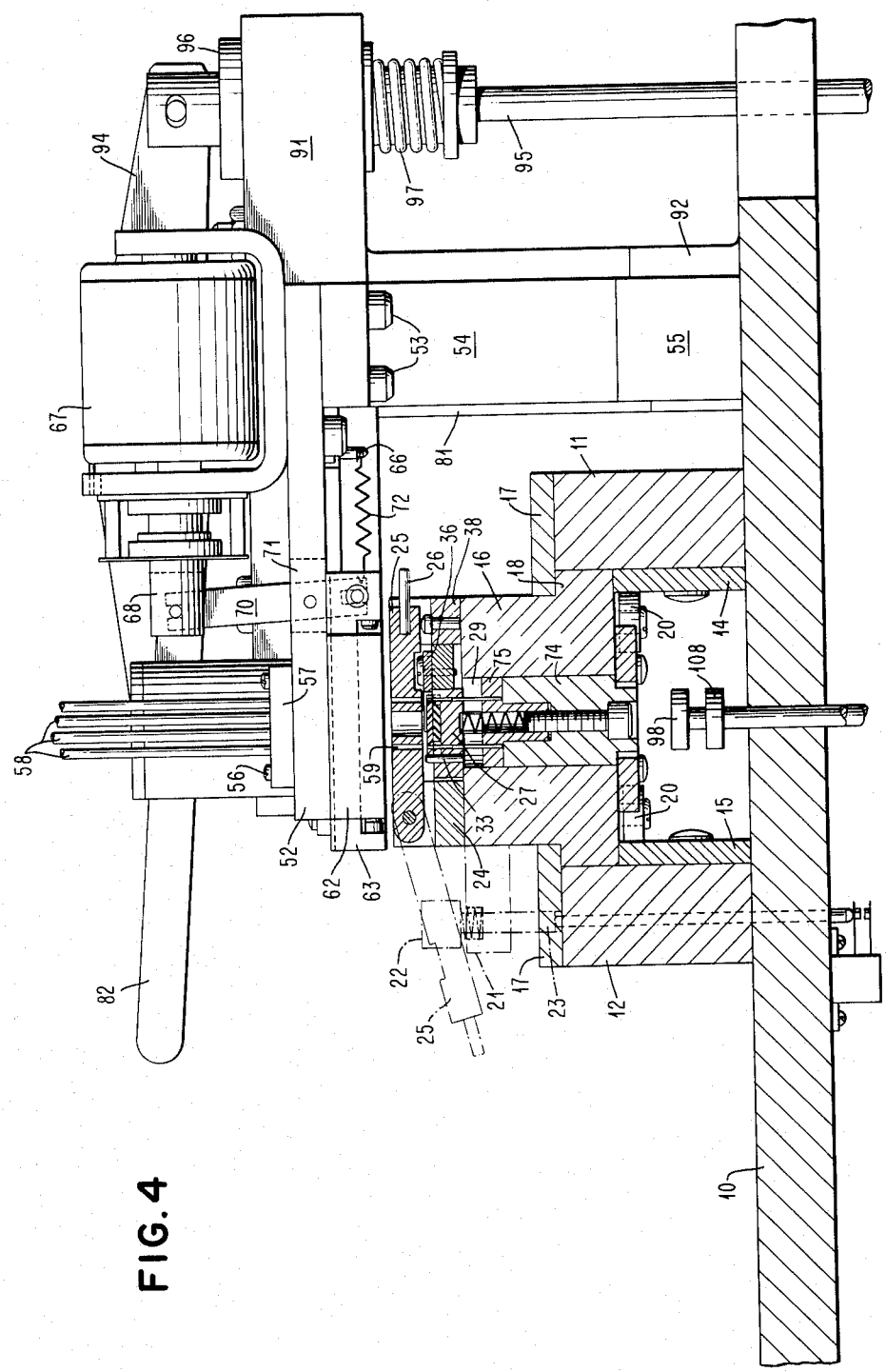

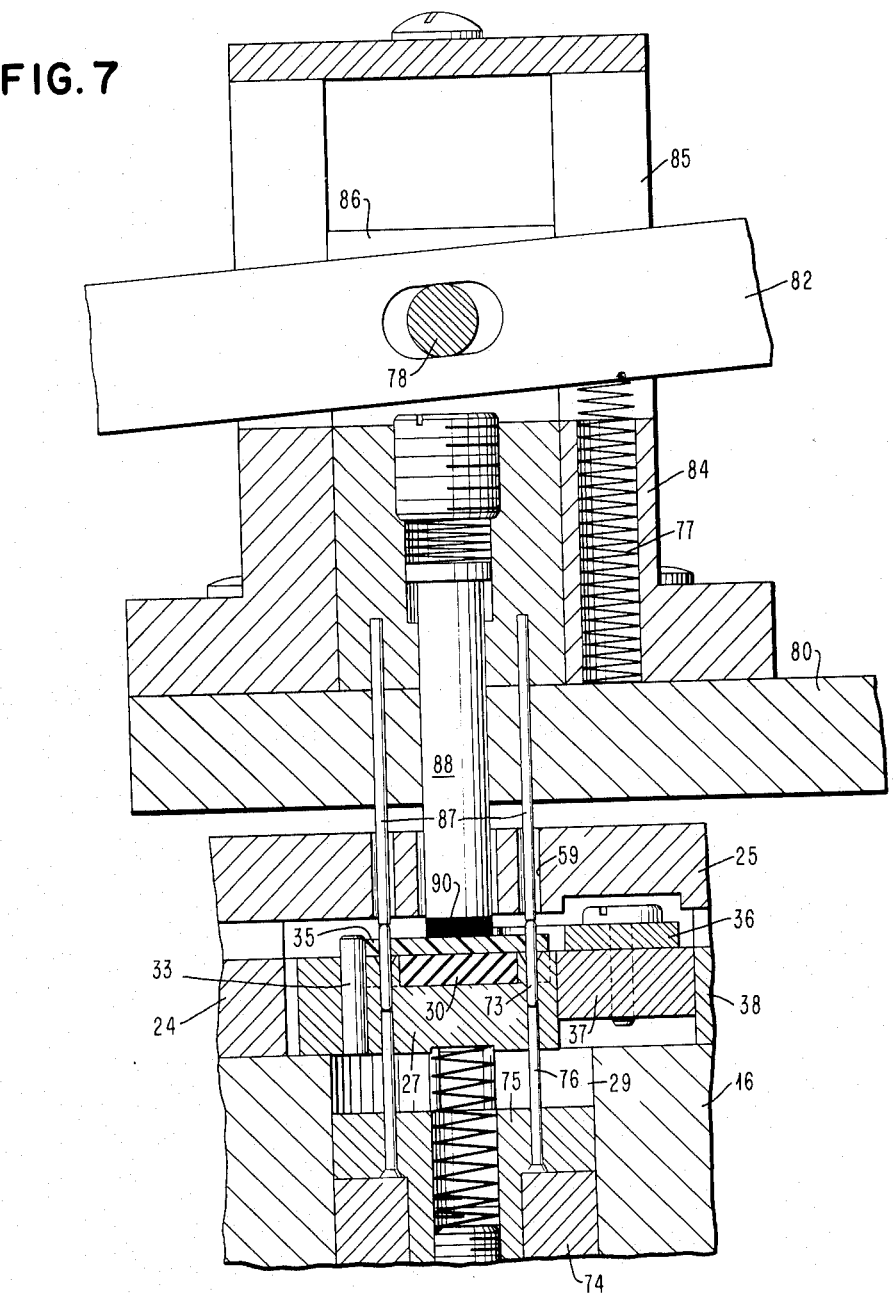

June 28, 1966  A. A. STRICKER  3,257,708
SUBSTRATE WITH CONTACT PINS AND METHOD OF MAKING SAME
Filed April 5, 1965  8 Sheets-Sheet 6
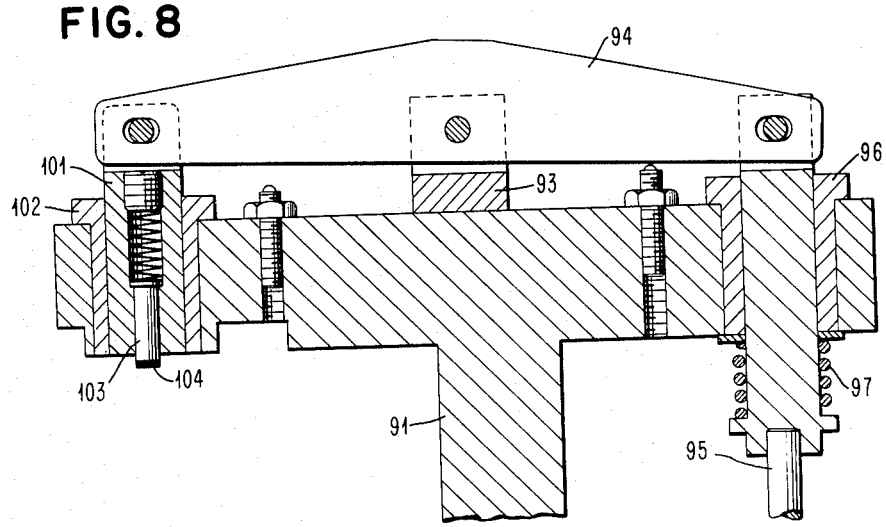
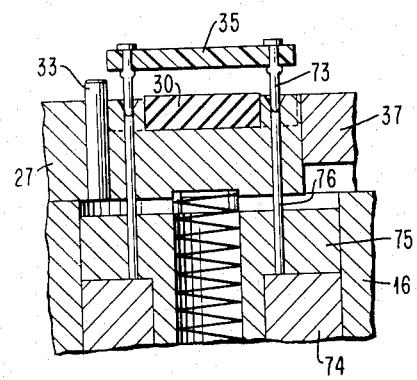
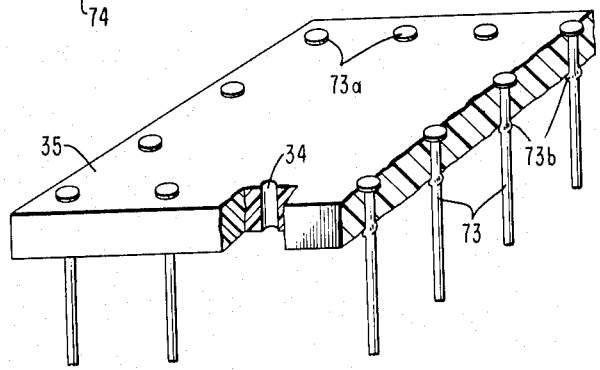

June 28, 1966  A. A. STRICKER  3,257,708
SUBSTRATE WITH CONTACT PINS AND METHOD OF MAKING SAME
Filed April 5, 1965  8 Sheets-Sheet 7

United States Patent Office 3,257,708
Patented June 28, 1966

3,257,708
SUBSTRATE WITH CONTACT PINS AND METHOD
OF MAKING SAME
Alfred A. Stricker, Wappingers Falls, N.Y., assignor to
International Business Machines Corporation, New
York, N.Y., a corporation of New York
Filed Apr. 5, 1965, Ser. No. 445,307
3 Claims. (Cl. 29—155.55)

This application is a continuation-in-part of application Serial No. 273,353, filed April 16, 1963, now Patent 3,216,097 by Alfred A. Stricker and Sol Kamenetsky, which is directed to apparatus for inserting contact pins into a substrate.

This invention relates to electronic packaging and, more particularly, to a ceramic substrate or base having a plurality of contact pins attached thereto. The invention also relates to the method of attaching the pins to the base.

With the advent of miniaturization of electrical components, and the forming of electronic packages thereof, there arose a need for a suitable substrate or base to which components and circuits could be added and for suitable connectors to provide means for electrically and mechanically interconnecting the components and circuits. Since ceramic bases or substrates possess most of the desirable characteristics and pluggable contact pins could provide the necessary connections, it has been proposed to employ conventional molding techniques to make the ceramic bases and to mechanically attach the pins. However, it has proved to be an unusually difficult problem to successfully fabricate a satisfactory base and contact pins. One difficulty arises because the contact pins must be accurately positioned and the holes in the base, provided to receive the pins, may not be located at the desired precise locations due to the particular method of forming the base. Another difficulty arises because a ceramic base is brittle and easily cracks or chips when subjected to excessive, although relatively light, external forces. This complicates not only attempting to mechanically attach the pins to the base but also attempting to position the pins. The above difficulties are further intensified because the contact pins must be rigidly attached to the base free from any movement, such as wiggle or rotation, relative thereto. Accordingly, the principal object of the invention is to provide a novel combination of ceramic base and contact pins and a novel method of making the combination, which successfully overcomes the above difficulties.

Another object is to provide a novel method for rigidly attaching a plurality of contact pins to ceramic base without cracking the base.

Still another object is to provide a novel method for attaching a plurality of contact pins to a brittle base while accurately positioning the terminal portions of pins.

A further object is to provide a novel electronic package comprising a brittle base having a plurality of contact pins rigidly attached or bonded thereto in precise locations.

Another object is to provide a relatively low-cost electronic package and method of making it that is suscetpible to being mass produced.

The foregoing and other objects, features and advantages of the invention will be apparent from the following more particular description of the invention, as illustrated in the accompanying drawings.

Figure 5:
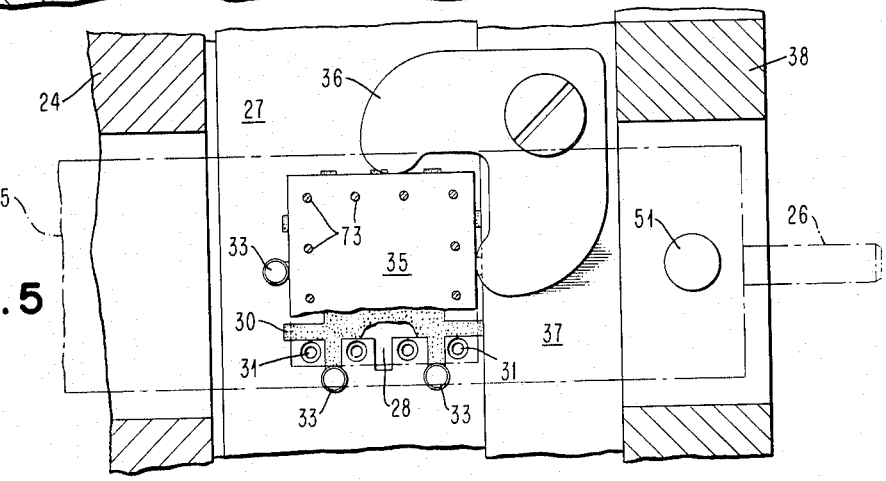
Figure 9:
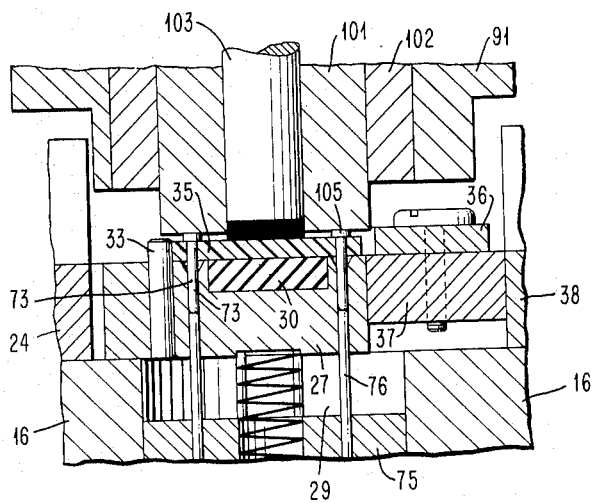
Figure 10:
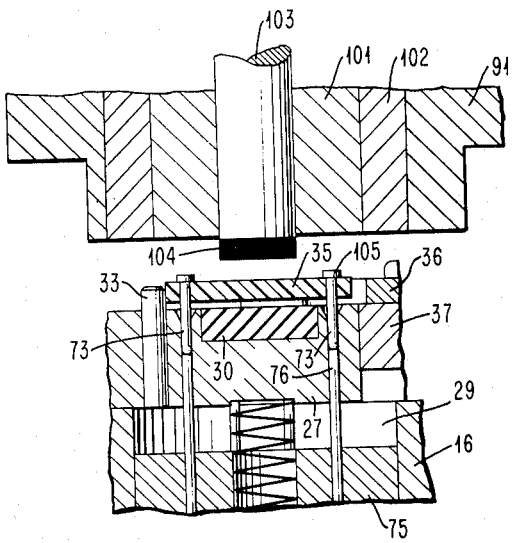
Figure 11:
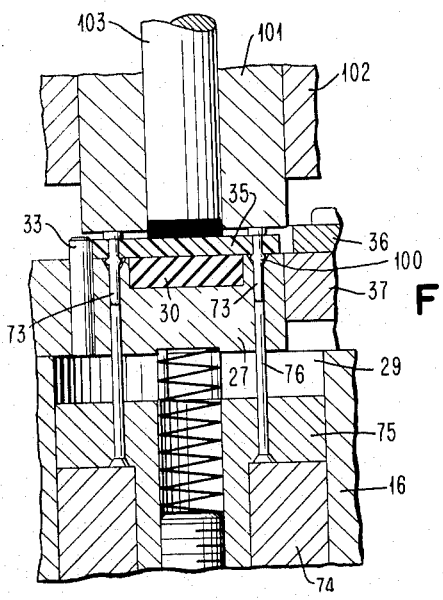
Figure 14:
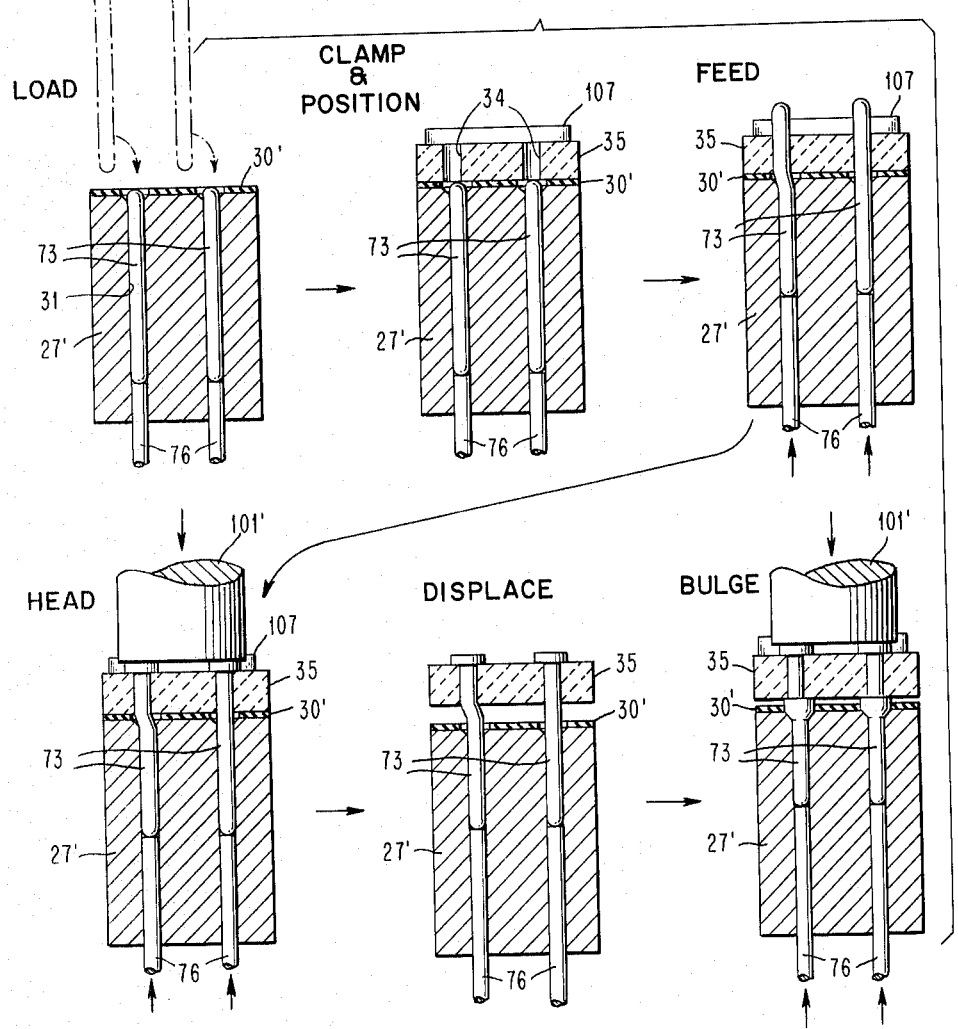
Figure 15:
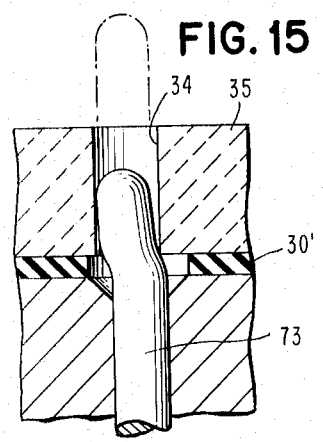
Figure 16:
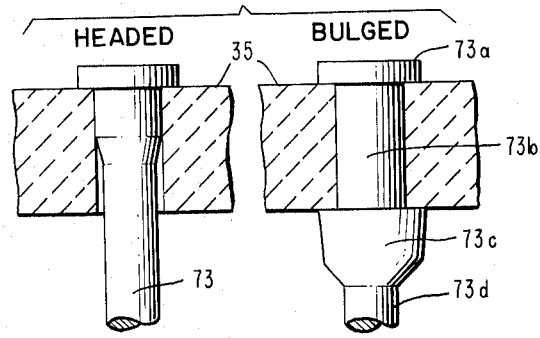

In the drawings:
FIGS. 1 and 1A when combined in accordance with FIG. 2 form a plan view of one form of apparatus for carrying out the method of and producing the invention.
FIG. 3 is a detail of a clamp operating mechanism.
FIG. 4 is a cross section taken along line 4—4 of FIG. 1A showing the arrangement of parts in side elevation.
FIG. 5 is an enlarged view of the carrier for the substrate.
FIG. 6 is an enlarged cross section taken along line 6—6 of FIG. 1A showing a mechanism for feeding the pins.
FIG. 7 is an enlarged cross section taken along line 7—7 of FIG. 1.
FIG. 8 is a cross section taken along line 8—8 of FIG. 1.
FIG. 9 is a combined cross section of a portion of the carriage as taken along line 4—4 of FIG. 1A and a portion of the punch taken along line 8—8 of FIG. 1 showing the punch forming heads on the pins.
FIG. 10 is similar to FIG. 9 and shows the substrate raised prior to bulging.
FIG. 11 is similar to FIG. 9 and shows the position of parts during bulging of the pin.
FIG. 12 is similar to FIG. 6 showing the finished substrate being expelled from the die.
FIG. 13 is an isometric view of a finished substrate partly in cross section.
FIG. 14 is a schematic illustrating a modified method.
FIG. 15 is an enlarged detail view of a pin being fed into the substrate.
FIG. 16 is an enlarged detail view useful in understanding certain principles.

The invention deals with attaching contact pins to a ceramic base or substrate that has a plurality of parallel holes adapted to receive the pins. The substrate may have circuitry thereon or the circuitry may be added at a later time. The substrate contains a material such as alumina, that provides the desired electrical, mechanical and thermal characteristics for use in an electronic package. Substrates of such materials are made by conventional techniques whereby the holes are located relative to each other within a tolerance greater than that of the location of the terminal or plug-in portions of the attached contact pins. The contact pins are preferably of copper, such as OFHC, or a copper alloy, that has been rolled or drawn and annealed wholly or partly so that the pins are ductile and can be readily cold worked at room temperature. Thus, the pins are good electrical conductors, they can be tinned or soldered, and they work or strain harden upon being cold worked. The invention utilizes the ductility of the pins in the following ways. First, the terminal portions of the pins are engaged by a die that positions the pins laterally relative to each other in the desired, relatively precise, locations. The pins are fed through the holes in the substrate, either by being fed from the die or by being fed through the holes into the die. The ductility of the pins allows them to bend as they are moved between the die and the substrate, due to any misalignment between the holes in the substrate and the holes in the die. Second, the pins are mechanically deformed into engagement with the substrate at room temperature so the pins strain harden and thereby develop a higher strength bond.

One form of apparatus for carrying out the method of the invention is shown in FIGS. 1–12, the apparatus being claimed in the aforementioned copending application. The illustrated apparatus generally comprises a track along which a carriage or table carrying the substrate is positioned sequentially at four stations. At the first station the substrate is manually positioned and locked on the table. At the next station, the contact pins are located in the substrate. At the third station, the pins are pushed through the substrate into contact with plungers in a die in the carriage. The fourth station comprises a ram that upsets a head on the pins and a ram in the table that raises the substate and pins to a point in the die where the first ram, by a second operation, upsets a bulge on the pins below the substrate.

Referring to FIGS. 1 and 1A combined and FIG. 4, we see a base 10 on which is mounted a pair of bars 11 and 12 extending the length of the base on the inner surface of which is secured a pair of rails 14 and 15 on which a rectangular block or table 16 slides. Two cover strips 17 are secured to the bars 11 and 12 and engage shoulders 18 formed on the block 16. Four rollers 20 secured to the bottom face of the block and bearing on the inner face of rails 14 and 15 guide the table and prevent binding. An ear 21, formed on table 16 and having a spring pressed pin 22 therein, provides a means for sliding the table along the rails. Holes, such as 23, provided at each station, are adapted to be engaged by pin 22 and thus locate the table with respect to the different stations A, B, C and D. Secured to the top of block 16 is a trunnion block 24 in which is mounted a guide member 25 for the pins which is provided with a handle 26 by which it can be swung to an open position shown by the dotted line position of FIG. 4. In this position, a die 27 (FIG. 5) is exposed in which is formed a nest 28 for a resilient block 30 of rubber or other suitable material described more fully hereafter. In forming the nest, die 27 is serrated to leave stock for holes 31 that act as further guides for the contact pins. The die 27 is secured over a cylindrical aperture 29 formed in the center of the table 16. A ram or plunger 74 reciprocating in this aperture will be described later.

Adjacent the nest 28 are three pins 33 for locating the holes 34 in the substrate 35 in alignment with the holes 31. An L shaped clamping member 36 is freely pivoted on a slide 37 in a groove between plate 27 and a bar 38. The slide is secured to table 16 by screws 40 acting in slots 41. One end of slide 37 is provided with a limit screw 42 that abuts the side of the table to prevent damage to rubber pad 30 when no substrate is located between pins 33 and clamp 36. A shoulder 43 (FIG. 3) at the other end of slide 37 acts against a spring 44 located in a channel 45 in the table 16 to hold the slide to the right. A solenoid 46 secured to the base 10 to the right of Station A has a bracket 47 (FIG. 3) secured to its frame on which is pivotally mounted an arm 48 having a rounded nose adapted to engage the shoulder 43 when the table is at Station A. Pivotally secured to the bottom of arm 48 is the plunger 50 of the solenoid which, when operated, will rock arm 48 moving slide 37 to the left freeing any substrate positioned on the table and permitting a new substrate to be placed on the cushion 30 and against pins 33. When the solenoid is released, the slide will move to the right (FIG. 1A) bringing first one arm and then the other of clamp 36 in engagement with the substrate until it is firmly held between the clamp and pins using only that force provided by the spring 44. After the substrate or wafer is positioned, as seen in FIG. 5, the guide block 25 is swung over substrate but kept from contact therewith by pin 51. The pin 22 is now withdrawn from the hole 23 at Station A and the table is moved to the left until the pin can drop into the positioning hole at Station B as shown in dot and dash lines (FIG. 1A).

Station B as shown in FIGS. 1A, 4 and 6, comprises a platform 52 secured by screws 53 to a T shaped post 54 having feet 55 that are welded to the base 10. Secured by screws 56 to the platform is a terminal block 57. The ends of tubes 58 leading from any form of feed (not shown) such as a vibrating bowl, shuttle, etc. are force fitted in terminal block 57 and platform 52. The tubes and holes are arranged in a pattern similar to that in guide 25 but not in alignment therewith.

On the underside and to the front of platform 52 is secured a slotted plate 62. Slidably mounted in this plate is a shuttle 63 containing holes 64 that correspond and align with holes 65 in plate 62. These holes are in alignment with holes 59 in the guide 25. Secured to the platform 52 is a solenoid 67 the plunger 68 of which is connected to the top of a lever 70 that is pivoted in a slot 71 in the platform. The lower end of the lever is connected to the shuttle 63 by a pin and slot connection. A spring 72, fastened to the bottom of lever 70 and extending to a pin 66 on the platform, holds the shuttle in the position of FIG. 4. In this position the holes 64 are not in register with holes 65 in the plate 62. This will permit a contact pin 73 that has been fed down each of the tubes 58 in terminal block 57 to drop down into holes 64 and come to rest on the upper surface of block 62. The head of each pin in this position will extend into a slot 69 cut in shuttle 63. When the solenoid 67 is operated and the shuttle moved to the position of FIG. 6, the pins 73 in the shuttle will drop through holes 65 and come to rest partially in holes 59 and in the holes 34 in the ceramic substrate. Meanwhile, the pins in the tubes 58 and platform 52 have dropped down onto the surface of shuttle 63 as seen in FIG. 6. Any discrepancy in the location of the holes 34 in the substrate 35 is overcome by forming the holes 59 in the guide slightly oversize. This allows the pins 73 a small amount of freedom in seeking entrance to the holes 34.

Mounted for reciprocation in block 16 by any well known means such as an air cylinder under the base (not shown) is a ram 74 having a head 75 secured thereon in which is secured plungers or rods 76 equal in number and pattern to the holes in substrate 35. The rods extend upward into the die 27. The holes 31, which equal in number and pattern of the holes 34 of the substrate, are countersunk at their top to act as a guide to facilitate entry of pins 73 into the die.

Next, table 16 is moved to Station C (FIGS. 1 and 7) and located by pin 22 as above. Station C comprises a platform 80 secured to a column 81 similar to the column 54. The end of a lever 82 is pivoted in a trunnion block 83 secured to the top of the platform. Secured to the top of the platform is a cylindrical member 84 that is slotted at 85 to accommodate the center of lever 82. Reciprocably mounted in the cylinder is a ram 86 to which the lever is connected by a pin and slot 78 connection. Secured in plunger 86 and extending through the platform 80 are rods 87 similar to rods 76. Also mounted in member 84 and spring biased downward is a cylindrical finger 88 that is tipped with a rubber cushion 90. When the lever 82 is rocked downward against the action of spring 77 by the operator to the position of FIG. 7, the rods 87 will force pins 73 down onto rods 76 in die 27 and finger 88 will resiliently press the substrate 35 down onto the pad 30 holding it firmly to prevent fracture during the inserting of the contact pins. Back fracturing, due to the brittle nature of the ceramic material, is prevented by forming pad 30 so that it projects above die 27 a slight amount and has a sufficient durometer hardness to prevent any direct contact between the die and substrate. The rounded ends of the pins and the chamfered or countersunk tops of the holes guides the pins into holes 31 of die 27. If the holes in the die and in the substrate are not aligned, the pins will bend as they move between the substrate and base.

After the pins are seated and lever 82 is raised, the table 16 is moved to Station D. After leaving Station C, guide member 25 is opened. Station D comprises a T shaped platform 91 (FIGS. 1 and 8) having feet 92 secured to the base. A trunnion block 93, secured to the center of the platform, carries a walking beam 94. One end of the beam is connected by a pin and slot connection to a piston rod 95 mounted in a sleeve 96. The rod 95 is biased downward by a spring 97 and is operated by an electrically controlled air cylinder (not shown) mounted under the base. The rod when actuated will drive the walking beam counterclockwise (FIG. 8). The front end of beam 94 is connected by a pin and slot connection to a ram 101 acting in a sleeve 102. Slidably mounted in the plunger is a finger 103 that is spring biased downward. A cushion 104 of rubber or other resilient material is bonded to the end of the finger.

With the contact pins 73 positioned as shown in FIG. 7, if the air cylinder is operated, the plunger 101 will descend (FIG. 9) and press or form a head 105 on each of the pins. As was the case at Station C, the rubber block and finger will exert a firm but resilient hold on the substrate. When the air cylinder is reversed the spring 97 will assist in rocking the beam clockwise raising the plunger 101. At this time any well known device such as an air cylinder (not shown) will raise piston rod 98 (FIGS. 4 and 12) in turn raising ram 74 with rods 76 that will raise the substrate and pins to the position of FIG. 10 where it will be held while the air cylinder is again operated rocking the beam 94 counterclockwise to move the plunger 101 to the position of FIG. 11. During this movement the metal of the pins flows into the countersunk portion of the die 27 to form the bulge 106 (FIG. 13) below the substrate. This action not only forms the bulge but forces the bulge into the substrate. Here again the wafer is held firmly by finger 103 against pad 30 to prevent cracking or chipping of the relatively brittle substrate. Thereafter, table 16 is returned to Station A, the substrate and contact pins are released, it is then expelled, as by moving plunger 108 upwardly against ram 75, to raise it, as shown in FIG. 12, and the operation is repeated.

The method of the invention is further illustrated, in a modified form, in FIG. 14 with reference to attaching two pins 73 to the substrate, it being understood that the invention is not limited to any particular number of pins since either one or several can be attached and several can be attached either one-at-a-time, progressively or simultaneously. As shown in FIG. 14, pins 73, with rounded ends thereon, are first loaded in holes 31 of die 27'. Next, the substrate and die are positioned adjacent to each other to align the holes therein. In FIG. 14, the left hole 34 is shown slightly out of alignment with the corresponding hole 31 in the die while the right hole 34 is aligned. As previously indicated, such misalignment is due to the difference in tolerances between the location of the holes relative to each other in the substrate and of the holes relative to each other in the die.

As an illustrative specific example of certain dimensions and tolerances, contact pins, having diameters of .0205", plus .0000", minus .0005", have been attached to substrates, having holes of diameters .022" plus or minus .001" located within tolerances plus or minus .003" from the center of the substrate, by means of a die having holes of diameters .0207" plus .0002", minus .0000", located within tolerances plus or minus .0005" from the center of the die. The more precise die hole location accurately locates the terminal portions of the contact pins.

The substrate is then resiliently clamped or suspended between pad 30' on die 27' and another rubber-like pad 107, the pads being effective to firmly grip the substrate and prevent it from contacting the die. The extent to which pad 30' projects above the top of die 27' is a function of the durometer hardness of the rubber and of the loads to be applied and these are chosen so that the gap between the die and substrate is no less than only a few thousandths of an inch. In FIG. 14, the gap is greatly exaggerated for clarity of understanding while in the apparatus of FIGS. 1–12 the gap is not clearly shown because of its relative small size.

Next, pins 73 are pushed upwardly through the holes in the substrate until the upper ends of the pins project above the substrate each by an amount that will allow each end to be upset without buckling to form a head of sufficient size to firmly grip the substrate. If the holes are aligned, the pins readily pass through the substrate, but if a hole in the substrate is slightly displaced, as the illustrated left-hole, the pin bends, as illustrated in FIG. 15, allowing the tip to enter the hole, due to the roundness of the end of the pin, and allowing the pin to feed through the hole. This mode of feeding each pin is advantageous relative to the method described in connection with FIGS. 1–12 because it requires less power, since a shorter portion of each pin is fed through the substrate, and it increases die life, since, with the former method, any ceramic particles in the holes are pushed into the die where their abrasive action causes unwanted wear. In the method of FIG. 14, any ceramic particles in holes 34 are pushed to the top of the substrate.

After the pins 73 have been inserted through holes 34 of substrate 35, and while still resiliently suspending the substrate, the upper ends of the pins are upset at room temperature, against the substrate to form cold forged or upset heads that firmly abut the upper surface of the substrate around each hole. This can be accomplished by applying axially compressive forces to the ends of the pins. Since the upper ends of the pins are unconfined and unsupported radially, the axial forces cause the upper ends to decrease in length and increase in cross section and thereby form the radially enlarged heads. Since the terminal portions of the pins were located in holes 31 in die 27', and the diameters of holes 31 are close to those of the pins, radial expansion of the pins, due to the squeezing by the axial forces, is limited by the die. As the head is formed, the shank portion of the pin which extends through the holes in the substrate, is also partially permanently deformed or upset, at its upper portion, into engagement with the interior walls of the hole through which it passes. This upset extends about half way through the substrate as shown exaggeratedly and schematically in the left-hand view of FIG. 16.

Next, die 27' and substrate 35 are displaced slightly to provide therebetween, on each pin, a radially unsupported length or portion, the terminal portions of the pins being held in the die. Then each such unsupported portion is upset or bulged by again applying, at room temperature, axially compressive forces to the ends of the pins, one end now being in the form of a head, whereby the unsupported portion decreases in length and increases in radial cross section. Such action also squeezes the lower portion of the shank within the substrate against the lower portion of the hole, as illustrated in the right-hand view of FIG. 16. This results in a bond between the substrate and pins that is firm and rigid and will not allow any movement of the pins relative to the substrate. The squeezing action on the terminal portions of the pins within the die causes such portions to increase in diameter slightly until their diameters are those of the die holes less springback.

Since the pins are formed from a material that is rolled or drawn, the pins have longitudinal fibers therein which give a certain directional strength to the material. By applying the upsetting forces axially to the ends of the pins, and hence to the ends of the fibers, the fibers will form radially and thereby add to the strength of the resultant joint.

It will be thus seen that the resultant article or product produced by the above process is in itself novel. The product comprises the ceramic substrate having a plurality of parallel holes therein and a plurality of contact pins extending through the holes and attached to the substrate. With reference to FIG. 16, each pin thus has a cold forged head 73a upset against one side of the substrate, a shank 73b extending through the hole in the substrate and upset against the walls thereof, a bulge 73c upset against the opposite side of the substrate and a terminal portion 73d that is straight and is adapted to be plugged in to any suitable female connector. The locations of the terminal portions 73d of the terminal pins is relatively accurate because, throughout the forming operation, they were restrained from any lateral movement relative to each other by the die. The upset and squeezed portions of the pins are further characterized by the fact that they are of a higher strength than prior to being deformed, due to the strain hardening of the material and due to controlling the fiber flow line. Thus, instead of weakening the joint, the joints, bonds or attachments are strengthened.

It is to be also noted that the ceramic substrate, which although brittle and easily fracturable, remains unfractured because of the resilient suspension and because the upsetting forces are applied to the ends of the pins, rather than against the substrate. The only time that a force is applied against the substrate is when the upper end of each pin flows against the substrate as head 73a is formed; however, these forces are balanced by the resilient force of rubber pad 30' to prevent contact between the substrate and die. Similarly, when the bulge is formed and material flows against the underside of the pin, such forces are cushioned by the upper pad 107. Additionally, the axially applied forces are developed through pressure rather than, for example, by a hammer blow and are therefore relatively slow and free from any shock that might be transmitted into the substrate.

As previously indicated, the substrate may have circuitry thereon. This may be in the form of a film wherein the holes in the substrate extend through those portions to which the pins are to be connected, and such connections are made upsetting the pins against the circuit surrounding the hole. Thus, the term "substrate," as used in the claims, includes both those with or without circuitry thereon.

While the invention has been particularly shown and described with reference to illustrative embodiments thereof, it will be understood by those skilled in the art that the foregoing and other changes in form and details may be made therein without departing from the spirit and scope of the invention.

What is claimed is:

1. In a method for making an electronic package, the steps comprising:

providing a base having a plurality of holes therethrough located relative to each other within a first tolerance;

providing a plurality of contact pins having rounded ends and longitudinal fibers;

positioning said pins in holes in a die in substantial alignment with said holes in said base whereby said pins are located relative to each other within a second tolerance smaller than said first tolerance.

feeding said pins from said die through said holes in said base until the ends of said pins project through said base an amount that allows said pins to be upset without buckling, said feeding being operative to bend said pins as they enter said holes due to any lateral displacement between the holes in said die and the holes in said base which displacement is greater than the radial difference between the outer diameter of a pin and the inner diameter of a hole in said base;

applying axially compressive forces to the ends of said pins so as to upset said one end against said base and form a cold forged head;

and thereafter applying axially compressive forces to said upset ends and the other ends of said pins so as to upset a bulge into engagement with the other side of said base and thereby firmly attach said pins to said base.

2. The method of claim 1 wherein said holes in said base are larger in diameter than said pins and the upsetting of said heads and bulges is effective to upset those portions of said pins within said holes into firm engagement with the walls thereof to increase the resistance of said pins to any rotative movement relative to said base.

3. The method of claim 1 wherein said base is resiliently clamped between two rubber like pads as the pins are fed through said base and while the pins are upset.

References Cited by the Examiner
UNITED STATES PATENTS

| | | | |
|---|---|---|---|
| 1,900,099 | 3/1933 | Ferguson | 339—220 X |
| 1,914,651 | 6/1933 | Reutter | 339—220 |
| 2,533,987 | 12/1950 | Bahr | 339—220 X |
| 2,979,600 | 4/1961 | Rangabe | 339—144 X |

PATRICK A. CLIFFORD, *Primary Examiner.*

W. DONALD MILLER, *Examiner.*